United States Patent [19]

Yamada et al.

[11] Patent Number: 4,856,067
[45] Date of Patent: Aug. 8, 1989

[54] SPEECH RECOGNITION SYSTEM WHEREIN THE CONSONANTAL CHARACTERISTICS OF INPUT UTTERANCES ARE EXTRACTED

[75] Inventors: Youichi Yamada; Keiko Takahashi, both of Tokyo, Japan

[73] Assignee: Oki Electric Industry Co., Ltd., Tokyo, Japan

[21] Appl. No.: 82,211

[22] Filed: Aug. 6, 1987

[30] Foreign Application Priority Data

Aug. 21, 1986 [JP] Japan .................. 61-196271
Aug. 21, 1986 [JP] Japan .................. 61-196273

[51] Int. Cl.$^4$ .............................................. G10L 7/08
[52] U.S. Cl. .......................................... 381/45; 381/43
[58] Field of Search ..................... 381/39, 43, 45, 50

[56] References Cited

U.S. PATENT DOCUMENTS 4,060,694 11/1977 Suzuki et al. ................. 381/45
4,388,495 6/1983 Hitchcock ..................... 381/43
4,415,767 11/1983 Gill et al. ...................... 381/45
4,624,010 11/1986 Takebayashi .................. 381/43
4,625,287 11/1986 Matsuura et al. ............. 381/43 X

OTHER PUBLICATIONS

1985 IEEE, pp. 842–845; "Speaker Independent Telephone Speech Recognition", Horishi Iizuka.

Primary Examiner—William M. Shoop, Jr.
Assistant Examiner—Marc S. Hoff
Attorney, Agent, or Firm—Spencer & Frank

[57] ABSTRACT

In a speech-recognition system in which time-series patterns of characteristic quantities are extracted from an input utterance within a voiced interval, the local-peak patterns, which are the results obtained by stably extracting the characteristics of the steady vowel portions, and the consonantal patterns, which are the results obtained by stably extracting the characteristics of the consonantal portions, are recognized and identified. This makes it possible to perform accurate and stable speech-recognition including also the characteristics of the consonants.

5 Claims, 11 Drawing Sheets

FIG.1A
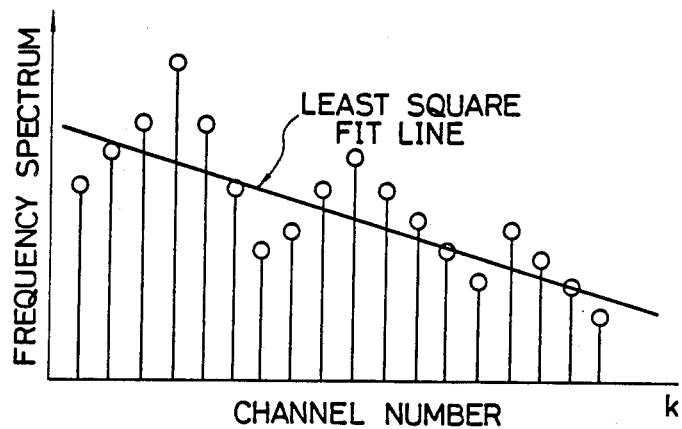
FIG.1B
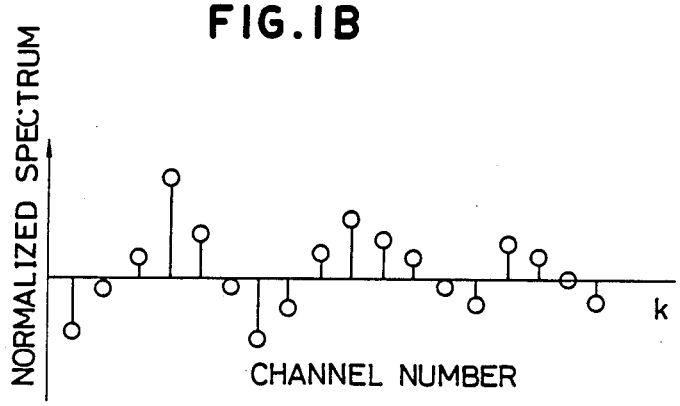
FIG.1C
O O O 1 O O O O O 1 O O O O 1 O O O
LOCAL-PEAK PATTERN

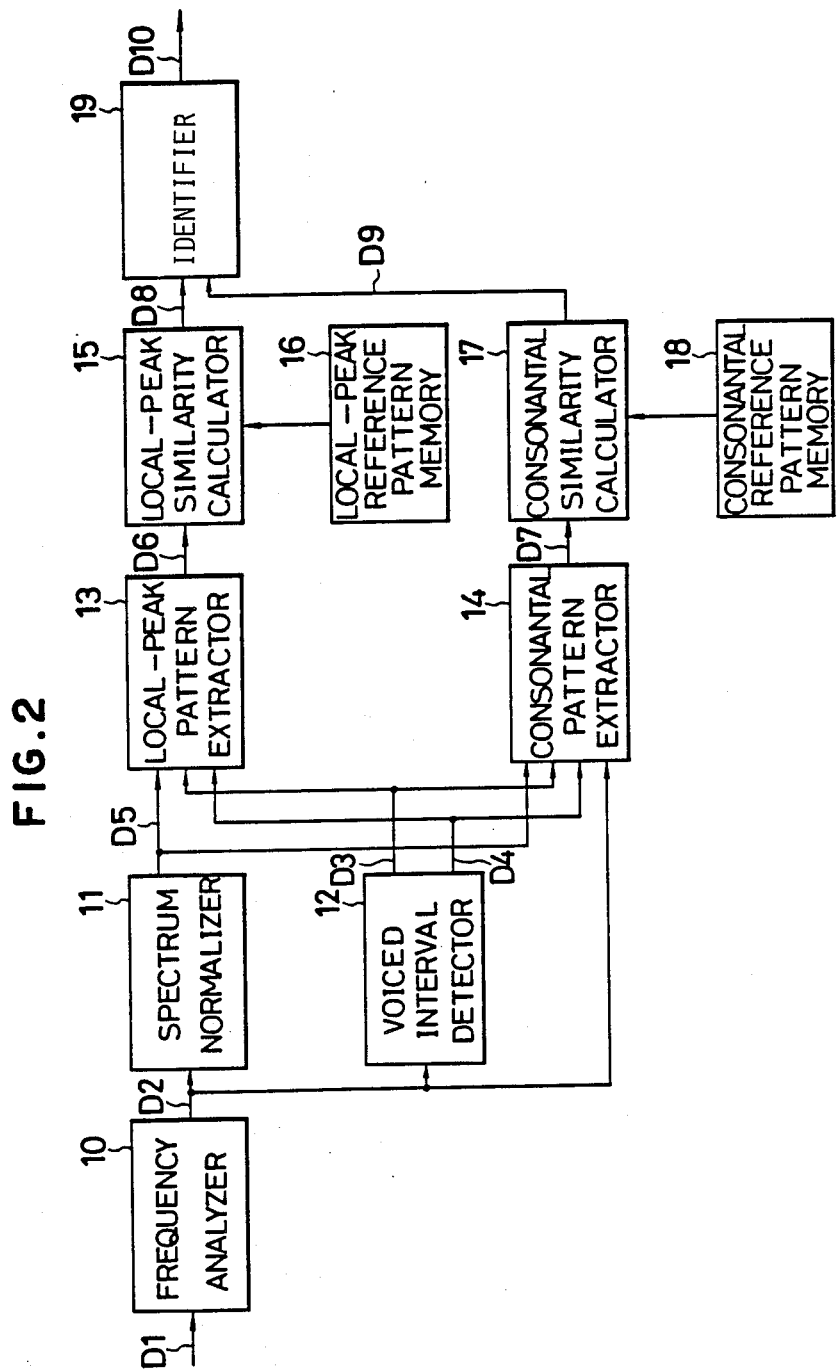

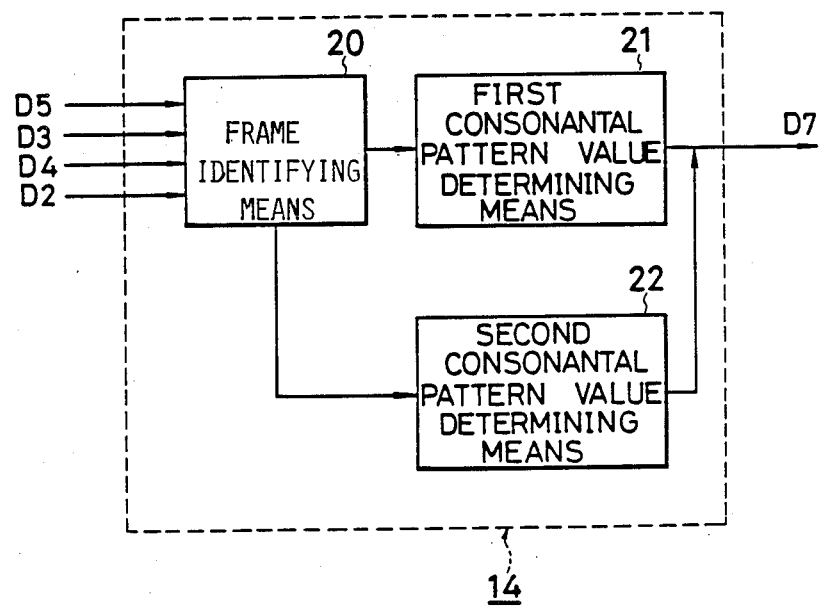

SPEECH RECOGNITION SYSTEM WHEREIN THE CONSONANTAL CHARACTERISTICS OF INPUT UTTERANCES ARE EXTRACTED

BACKGROUND OF THE INVENTION

This invention relates to a speech-recognition system, in particular to a speech-recognition system using pattern-matching technology.

In preforming speech recognition, it is extremely important, for the sake of improving the recognition performance, to extract stably and accurately the characteristics of the steady vowel portions of the input utterance. Among so for the following reasons. That is, the speech sounds uttered by human beings, the steady vowel portions occupy a larger percentage of time than the transitory (non-steady) portions, i. e. the parts changing from consonants or vowels to vowels, or from vowels to consonants. Moreover, since the steady vowel portions have a relatively long duration, they undergo little variation as a result of factors such as the timing of enunciation, and their characteristics can thus be extracted stably. Therefore, a system of recognition using chiefly the characteristics of the steady vowel portions is most effective.

The technology of extracting local peaks has been proposed as one which would be effective when used in the devices of the prior art for extracting the characteristics of the steady vowel portions. This technology aims at detecting the formant positions of the steady vowel portions.

FIGS. 1A to 1C are explanatory drawings of this technology. With this technology, input speech signals are converted from analog to digital signals and are then subjected to frequency analysis by means of band-pass filters with different central frequencies (the central frequencies are numbered by assigning channel numbers k, in which k is a positive integer, to channels corresponding to each central frequency) and to logarithmic conversion in sequence at prescribed time intervals (hereinafter called "frames"). Then the frequency spectra obtained in this way are calculated (FIG. 1A), and the spectra are normalized by subtracting from these frequency spectra and the least square fit line of the spectra (FIG. 1B). The local peak patterns are then extracted in terms of one-bit characteristic quantities. This is, among the channels which have a normalized spectra value larger than 0, the channels which have maximum output signal values are assigned local peak values of 1, ; and the remaining channels are all assigned local peak values of 0. (FIG. 1C)

Then the degrees of similarity are calculated between the local peak patterns extracted in the manner described above and reference patterns which have been prepared in advance. The similarity is calculated for each category to be recognized, and the name of the category giving the largest degree of similarity among all the categories to be recognized is output as the result of the recognition.

Local peaks are characteristics by which the formant zones of the steady vowel portions are extracted, and the latter can be recognized by them with a high stability.

However, it is difficult to extract stably the characteristics of the consonant portions, for example, of fricatives such as /s/ or /ch/. This is so for the following reason. The local peak technology is a technology for extracting the zones in which the normalized spectra reach their maxima. In steady vowel portions, if the formant, which is the main characteristics of the steady vowel portions, is clear and stable then the maximum channel which corresponds to the formant can be derived stably. On the other hand, in the consonant portions such as fricatives, the formant is not clear. Therefore, the positions where the local peaks appear in the consonant portions are unstable and cannot easily be established unequivocally.

Consequently, there has been the following problem. It is difficult, by means of the local peak technology alone, to recognize and identify two utterances both of which have the same steady vowel portions, such as "ichi" (a Japanese word meaning "one") and "shichi" (a Japanese word meaning "seven"), because the characteristics of the consonant parts cannot be extracted stably by this method. As a result, this has led to a deterioration of the recognition performance.

SUMMARY OF THE INVENTION

An object of this invention is to eliminate the problems described above and to provide a speechrecognition system with superior recognition performance, configured so that the consonantal characteristics of input utterances will be extracted and used in calculating the similarity with reference patterns.

In order to achieve this object, this invention uses a speech-recognition system in which time-series patterns of characteristic quantities are extracted from an input utterance within a voiced interval, i. e. within a time interval from the start point of the utterance until its end point. The degrees of similarity are calculated between these time-series patterns and reference patterns prepared in advance. The similarity is calculated for each category to be recognized, and the categories having the largest similarity among all the categories to be recognized is used as the result of the recognition. This speech-recognition system comprises the following:

(a) A spectrum normalizer. It performs frequency analysis in a plurality of channels (numbered by their central frequencies) and logarithmic conversion and extracts the frequency spectra. It then calculates normalized spectrum patterns by normalizing the frequency spectra with least square fit lines.

(b) A consonantal pattern extractor. It makes judgement as to whether each frame has consonantal properties and creates consonantal patterns by processing in sequence the frames within a voiced interval, extracting the consonantal patterns in those frames which are judged to have consonantal properties, and not extracting consonantal patterns in those frames which are judged to lack consonantal properties (i. e., in which the value is set at 0 in all channel components).

(c) A local-peak pattern extractor. It creates local peak patterns by processing all the frames within a voiced interval, assigning number 1 to those channel components in which the value of the normalized spectrum pattern is positive and reaches a maximum, and assigning number 0 to all the other channel components.

(d) A calculator of the degree of consonantal similarity. It calculates the similarity between the consonantal patterns calculated by the extractor in (b) and consonantal reference patterns prepared in advance. It calculates the consonantal similarity for each category to be recognized.

(e) A memory unit for the consonantal reference patterns.

(f) A calculator of the local-peak similarity. It calculates the similarity between the local-peak patterns calculated by the extractor in (c) and local-peak reference patterns prepared in advance. It calculates the local-peak similarity for each category to be recognized.

(g) An identifier which references both the consonantal similarity and the local-peak similarity and calculates the comprehensive similarity for each category to be recognized. Among all the categories to be recognized, the category which has the largest comprehensive similarity is used as the result of recognition.

The judgement as to whether each frame has consonantal properties can be made on the basis of the relative sizes of the value of the gradient of the least square fit line of the frequency spectrum and a predetermined thereshold value.

In this case, the consonantal pattern extractor can comprise the following components for the purpose of processing all of the frames within a voiced interval and creating the consonantal patterns:

(b1) A means for identifying frames. It calculates the gradients of the least square fit lines of the frequency spectra in the frames and determines that those frames which have gradient values larger than a predetermined threshold value have consonantal properties.

(b2) A first means for determining the consonantal pattern. In cases where a frame has been determined to have consonantal properties, it assigns a consonantal pattern value of 1 to the channel components which have normalized spectrum values larger than a predetermined threshold value, and a consonantal pattern value of 0 to the other channel components.

(b3) A second means for determining the consonantal pattern. In cases where a frame has not been determined to have consonantal properties, it assigns a consonantal pattern value of 0 to all the channel components in the frame.

The judgement as to whether each frame has consonantal properties can alternatively be made on the basis of the relative sizes of the normalized spectrum values at the high-band channel regions and low-band channel regions.

In this case, the consonantal pattern extractor can comprise the following components for the purpose of processing all of the frames within a voiced interval and creating the consonantal patterns:

(b1) A means for identifying frames. It determines that those frames in which the difference between the normalized spectrum values at the high-band channel regions and the low-band channel regions are greater than the predetermined threshold value.

(b2) A first means for determining the consonantal pattern. In cases where a frame has been determined to have consonantal properties, it assigns, to the channel components which have normalized spectrum values larger than a predetermined threshold value, the value of the normalized spectrum at this channel, and a consonantal pattern value of 0 to the other channel components.

(b3) A second means for determining the consonantal pattern. In cases where a frame has not been determined to have consonantal properties, it assigns a consonantal pattern value of 0 to all the channel components in the frame.

Thus, the speech-recognition system of this invention is able to carry out speech recognition accurately and stably for the following reason. That is, the local-peak similarities are given to the identifier. In addition, the normalized spectra obtained from the spectrum normalizer are processed in sequence by the consonantal pattern extractor and the calculator of the consonantal similarity, thus obtaining consonantal similarities at the consonantal frames, e.g., based on the relative sizes of the gradients of the least square fit lines of the frequency spectra as compared with predetermined threshold values, or based on the relative sizes of the normalized spectrum vales at the high-band channel regions and low-band channel regions. These consonantal similarities are also given to the identifier. Thus, recognition is performed by adding together the local-peak similarities and the consonantal similarities in this identifier and finding comprehensive similarities.

BRIEF DESCRIPTION OF THE DRAWINGS

FIGS. 1A to 1C are explanatory diagrams of a prior art technology of extracting local peaks.

FIG. 2 is a block diagram illustrating an embodiment of the invention.

FIG. 3A is a functional block diagram of the consonantal pattern extractor.

DESCRIPTION OF THE EMBODIMENTS

Figure 3B:
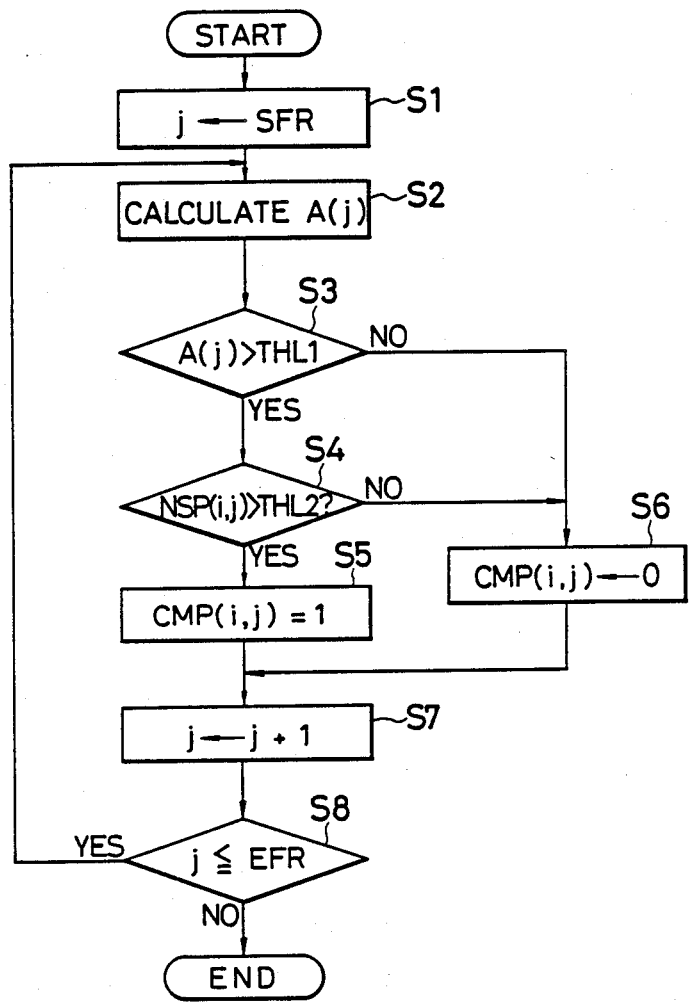
FIG. 3B is a flow chart for explaining the operations of the consonantal pattern extractor of FIG. 3A.

FIG. 2 is a block diagram illustrating a preferred embodiment of this invention. FIG. 3A is a functional block diagram of the consonantal pattern extractor, and FIG. 3B is a flow chart for explaining the operations of the consonantal pattern extractor. Using FIG. 2, FIG. 3A and FIG. 3B, the configuration and the operation of a preferred embodiment of the speech-recognition system of this invention will now be described.

The input utterance D1 is input into a frequency analyzer 10.

The frequency analyzer 10 performs band-pass filter analysis of a predetermined number of zones (hereinafter the numbered zones are called "channels"). The frequency spectra D2 output by the frequency analyzer are calculated at each predetermined time interval (frame) and are input into the spectrum normalizer 11, the voiced interval detector 12 and the consonantal pattern extractor 14.

The voiced interval detector 12 determines the timing of the start point and end point of the input utterance from the size of the values of the frequency spectrum D2 and generates a signal D3 for the start point and a signal D4 for the end point. It outputs both of them to the local-peak pattern extractor 13 and the consonantal pattern extractor 14. The spectrum normalizer 11 calculates a normalized spectrum D5 by subtracting the least square fit line of the frequency spectrum from the frequency spectrum and outputs it to the local-peak pattern extractor 13 and the consonantal pattern extractor 14.

The local-peak pattern extractor 13 processes in sequence all the frames from the start-point frame to the end-point frame. Of the channels in each frame which have positive normalized spectrum values, it assigns a localpeak pattern value of 1 to those channels in which the normalized spectrum values reach a maximum, and it assigns a local-peak pattern value of 0 to all the other channels. It outputs the results, i. e., the local peak patterns D6, to the calculator 15 of the local-peak similarity.

The calculator 15 of the local-peak similarity calculates the similarities between the local peak patterns D6 and all of the local-peak reference patterns which are stored in the memory unit 16 for the local-peak reference patterns. It outputs to the identifier 19 the local-peak similarities D8 for all the categories to be recognized.

The aforesaid frequency analyzer 10, spectrum normalizer 11, voiced interval detector 12, local-peak pattern extractor 13, calculator 15 of the local-peak similarity, memory unit 16 for the local-peak reference patterns, and identifier 19 are all components of the speech-recognition system using the local-peak extraction technology which have been proposed previously. Therefore, detailed explanations of them are omitted except in cases where they have special functions.

The speech-recognition system of this invention is configured so that the consonantal similarities are given, in addition to the aforesaid local-peak similarities D8, and the similarities are identified comprehensively in the identifier 19. Therefore, the consonantal pattern extractor 14, the calculator 17 of the consonantal similarity and the identifier 19 are configured so as to perform the operations described below.

The consonantal pattern extractor 14 is configured so as to create consonantal patterns D7 by the method described below in the section explaining FIG. 3A and FIG. 3B and to output them to the calculator of the consonantal similarity 17.

The calculator 17 of the consonantal similarity is configured so as to calculate the similarities between the consonantal patterns D7 and all the consonantal reference patterns which have previously been stored in the memory unit 18, and to output to the identifier 19 the consonantal similarity D9 for each category to be recognized.

The identifier 19 is configured so as to calculate the sum of the local-peak similarity and the consonantal similarity for each category to be recognized and to output, as the result of recognition D10, the category which has the largest total value of the similarity of all the categories to be recognized.

The aforesaid consonantal pattern extractor 14 is equipped, for example as illustrated in FIG. 3A with a means for identifying frames 20, which identifies whether or not the frame has consonantal properties, a first means 21 for determining the consonantal pattern value in frames which have consonantal properties, and a second means 22 for determining the consonantal pattern value in frames which do not have consonantal properties.

The means for identifying frames 20 calculates the gradients of the least square fit lines of the frequency spectra in the frames. It identifies as frames having consonantal properties those frames which have gradient values larger than a predetermined threshold value (for example 0), taking into consideration the plus and minus signs.

When a frame has been identified as having consonantal properties, the first means 21 for determining the consonantal pattern value assigns a consonantal pattern value of 1 to the channel components in the frame which have normalized spectrum values larger than a predetermined threshold value and determines that the other channel components have a consonantal pattern value of 0.

When a frame has not been identified as having consonantal properties, the second means 22 for determining the consonantal pattern value determines that the consonantal pattern value in the frame are 0 for all the channel components.

Next, the flow chart in FIG. 3B is used to explain in detail the operations of the consonantal pattern extractor 14, which is a major part of the preferred embodiment of this invention. Incidentally, the letter S is used to indicate the processing steps in the explanations below. The sequence of operations explained here is merely an example, and consequently the operations may be carried out in any other suitable sequence.

SFR stands for the start-point frame number; EFR for the end-point frame number, SP (i, j) for a frequency spectrum (i is the channel number, and j the frame number); NSP (i, j) for a normalized spectrum (i is the channel number, and j the frame number); CMP(i, j) for a consonantal pattern (i is the channel number, and j the frame number); and CHNNO for the number of channels subjected to frequency analysis. Moreover, j is the number of the frame from which consonantal patterns are extracted.

First of all, initialization is performed (j←SFR by the means for identifying frames 20 (s1).

Next, the following formula is used to calculate the gradient A(j) of the least square fit line of the frequency spectrum in the given frame (frame number j) (S2):

$$A(j) = \frac{CHNNO \cdot \sum_{i=1}^{CHNNO} i \cdot SP(i,j) - \sum_{i=1}^{CHNNO} i \cdot \sum_{i=1}^{CHNNO} SP(i,j)}{CHNNO \cdot \sum_{i=1}^{CHNNO} i^2 - \left(\sum_{i=1}^{CHNNO} i\right)^2} \quad (1)$$

It is then determined whether or not the following condition (A) is satisfied (S3):

$$A(j) > THL1 \quad (A)$$

(THL1 is a predetermined threshold value and is set at a value of approximately 0).

Next, if the aforesaid condition (A) is satisfied, i. e., if it has been determined that the frame has consonantal properties, the first means 21 for determining the consonantal pattern value determines whether or not the normalized spectrum output satisfies condition (B) (S4):

$$NSP(i, j) > THL2 \quad (B)$$

(THL2 is a predetermined threshold value and is set at a value of approximately 0).

In a channel which satisfies condition (B), it assigns the following value to the consonantal pattern (S5):

$$CMP(i, j) = 1.$$

In a channel which does not satisfy the aforesaid condition (B), it assigns the following value to the consonantal pattern (S6):

$$CMP(i, j) = 0.$$

On the other hand, if the aforesaid condition (A) is not satisfied, i, e., if it is not determined that the frame has consonantal properties, the second means 22 for determining the consonantal pattern value assigns the following consonantal pattern value to all the channels in the given frame (S6):

$$CMP(i, j) = 0.$$

After the consonantal patterns have been extracted from a given frame, the first means 21 and second means 22 for determining the consonantal pattern value add 1 to the frame number j (S7).

Next, all the frames are checked for the following condition to determine whether or not the aforesaid processes have all been completed:

$$j \leq EFR.$$

If this condition is satisfied, the processes from step S2 on are carried out again in sequence. If the condition is not satisfied, consonantal pattern extraction is terminated for the given input utterance (S8).

FIGS. 4A to 4C and 5A to 5C are diagrams for explaining chiefly the results of extraction of the local-peak patterns and consonantal patterns for utterances "ichi" and "shichi".

Figure 4A:
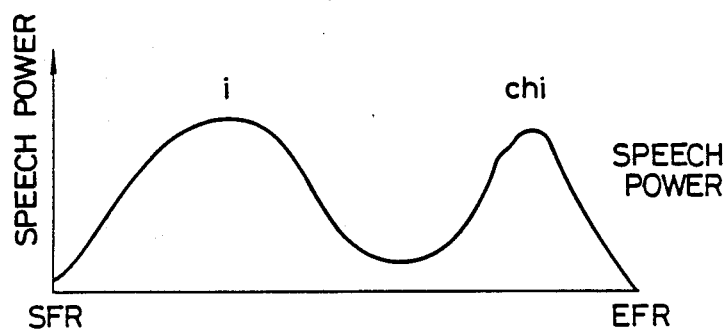
FIGS. 4A to 4C and 5A to 5C are diagrams for explaining the results of extraction of local peak patterns and consonantal patterns for utterances "ichi" and "shichi"
Figure 4B:
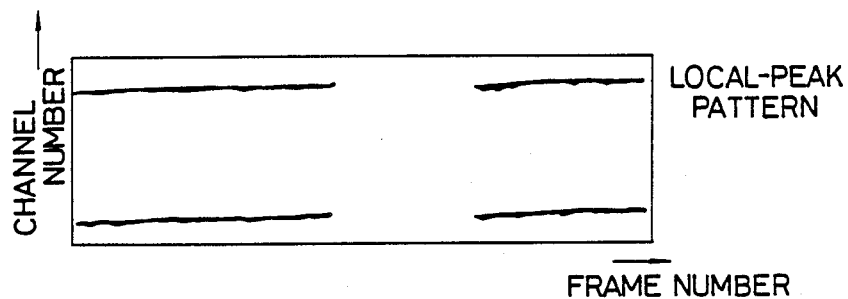
Figure 4C:
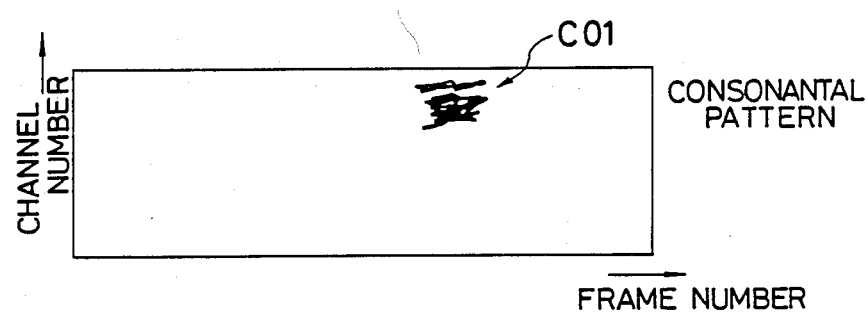
Figure 5A:
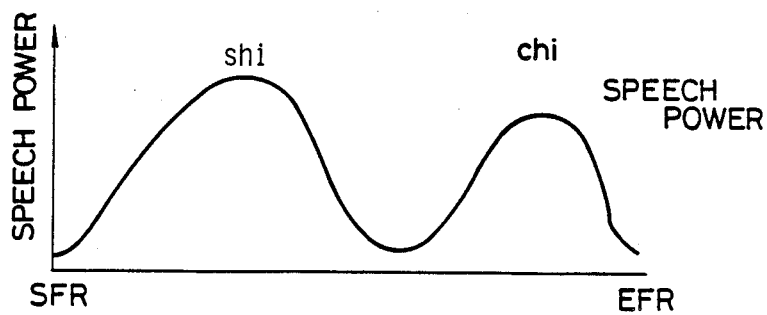

FIGS. 4A and 5A are speech power diagrams corresponding, respectively, to "ichi" and "shichi". The frame numbers are plotted on the abscissa and the speech power on the ordinate. FIGS. 4B and 4C and FIGS. 5B and 5C are local-peak pattern diagrams and consonantal pattern diagrams corresponding, respectively, to "ichi" and "shichi". The frame numbers are plotted on the abscissa and the channel numbers on the ordinate.

For the utterance "ichi" shown in FIG. 4A, the regions within which the local peak patterns obtained by the local-peak pattern extractor (13 in FIG. 2) are 1 appear as shown in the black parts in FIG. 4B. In addition, the region within which the value of the consonantal pattern obtained by the consonantal-pattern extractor (14 in FIG. 1) is 1 for the utterance "ichi" is shown by the black part C01 in FIG. 4C.

Figure 5B:
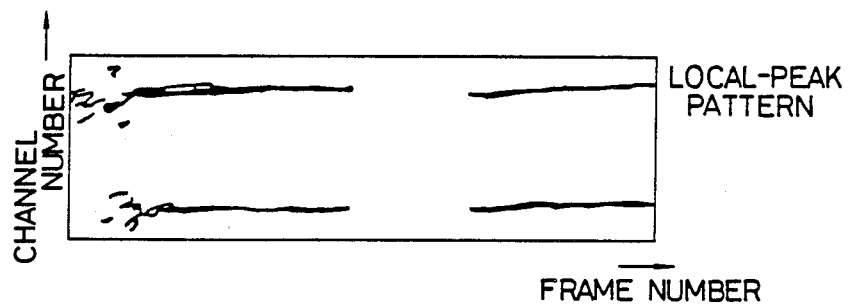
Figure 5C:
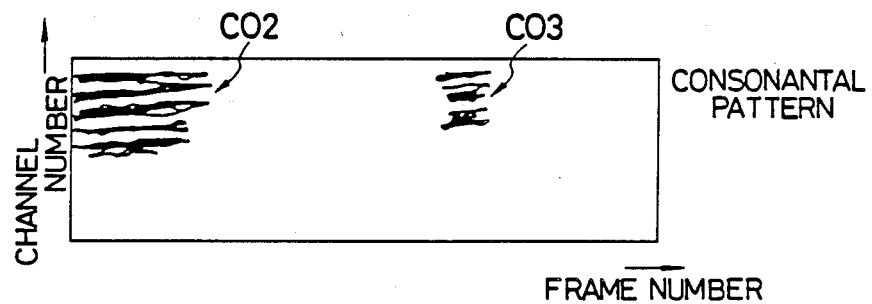

On the other hand, for the utterance "shichi" shown in FIG. 5A, the regions within which the local peak patterns are 1 and the regions within which the consonantal patterns are 1 appear, respectively, as shown by the black parts C02 and C03 in FIGS. 5B and 5C.

In this way, utterances "ichi" and "shichi" can be identified and distinguished accurately by means of the difference in the consonantal patterns at the beginnings of both words.

Figure 6A:
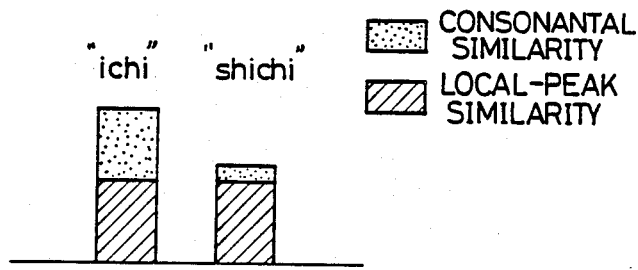
FIGS. 6A to 6B are explanatory diagrams of the comprehensive similarity.
Figure 6B:
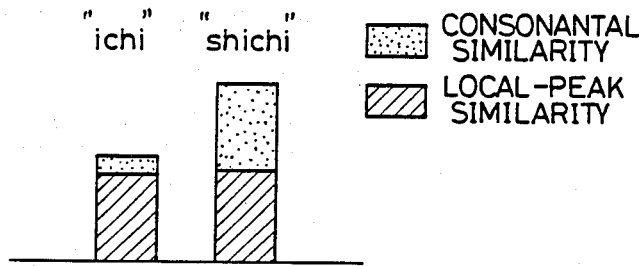

FIGS. 6A and 6B are explanatory diagrams of the comprehensive similarity, which indicates the contribution of the consonantal patterns to recognition. FIG. 6A shows the comprehensive similarity of the utterance "ichi", which has the speech pattern given in FIG. 4A, with respect to categories "ichi" and "shichi". FIG. 6B indicates the comprehensive similarity of the utterance "shichi", which has the speech pattern given in FIG. 5A, with respect to categories "ichi" and "shichi". In these diagrams, the parts marked with slanted lines indicate the local-peak similarities, and the parts marked with dots indicate the consonantal similarities. As can be understood from FIG. 6A, the comprehensive similarity of the utterance "ichi" differs greatly from the comprehensive similarity of the standard pattern for "shichi". Consequently, in either case, both utterances can be distinguished and identified accurately by means of the differences in their consonantal patterns.

Figure 7:
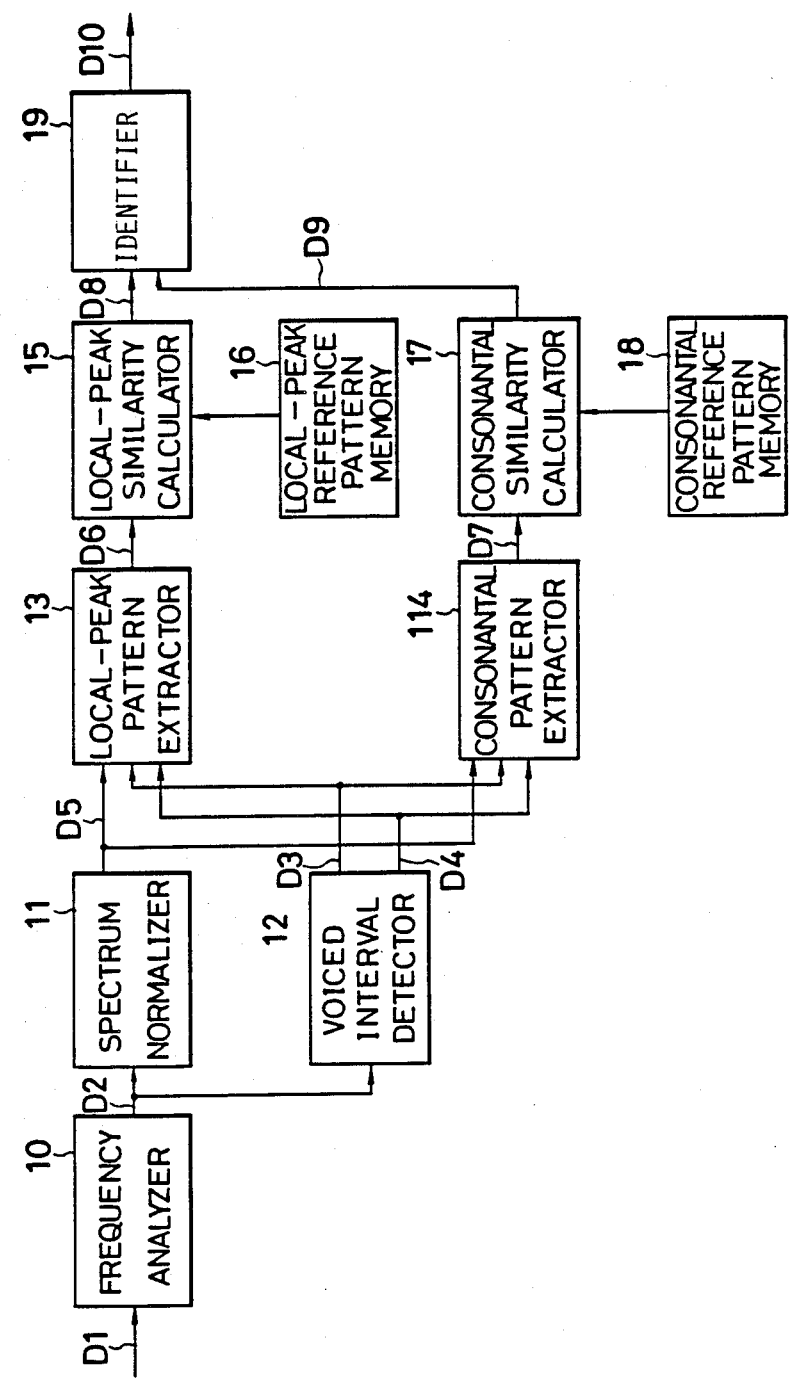
FIG. 7 is a block diagram illustrating another embodiment of the invention.
Figure 8A:
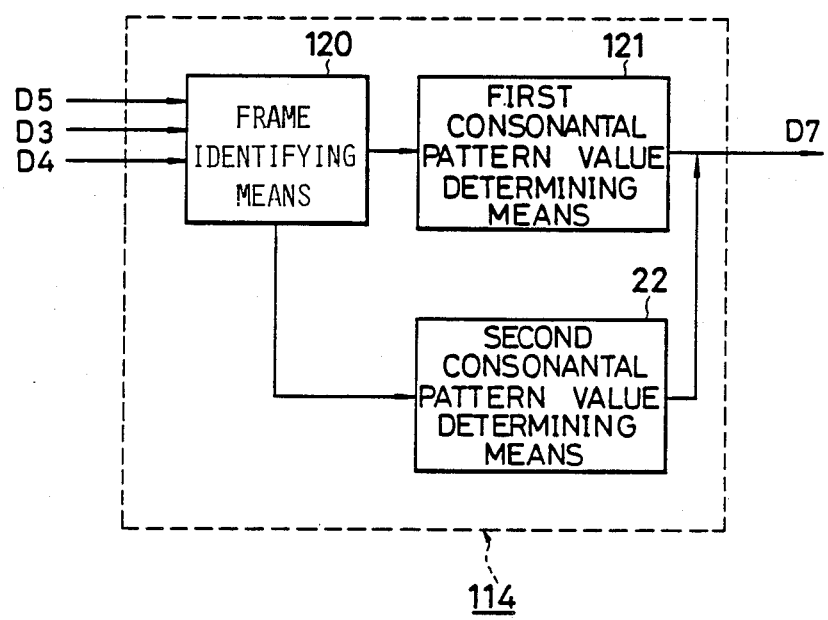
FIG. 8A is a functional block diagram of the consonantal pattern extractor incorporated in the embodiment of FIG. 7.
Figure 8B:
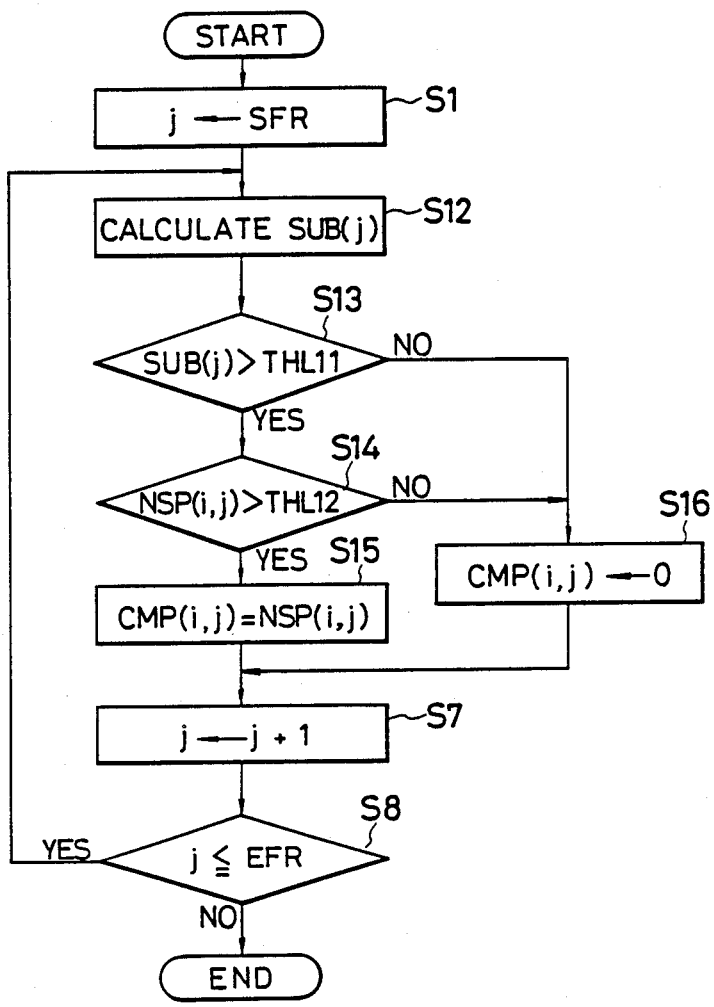
FIG. 8B is a flow chart for explaining the operations of the consonantal pattern extractor of FIG. 8A.

FIGS. 7, 8A and 8B shows another embodiment of the invention. The speech recognition system of this embodiment is generally identical to the system of FIGS. 2, 3A and 3B. The components having identical or similar functions are identified by identical reference numbers. The consonantal pattern extractor 114 has a different configuration. As illustrated, it does not require the frequency spectra D2 to be input. It makes judgement as to whether each frame has consonantal properties on the basis of the relative sizes of the normalized spectrum values at the high-band channel regions and the normalized spectrum values at the low-band channel regions.

It comprises a frame identifier 120 which determines those frames in which the difference between the normalized spectrum values at the high-band channel regions and the low-band channel regions are greater than a predetermined threshold value (e.g., 0).

The first consonantal pattern determining means 1212 of this embodiment differs from the first consonantal pattern determining means 21 of the previously described embodiment in that, where a frame has been determined to have consonantal properties, it assigns, to the channel components which have normalized spectrum values larger than a predetermined threshold value, the value of the normalized spectrum at this channel, and a consonantal value of 0 to the other channel components.

The second consonantal pattern determining means 22 of this embodiment is similar to the second consonantal pattern determining means 22 of the previously described embodiment.

FIG. 8B shows the operation of the consonantal-pattern extractor. The steps identical to those in FIG. 3B are identified by the same references.

At the step S12 the relative sizes of the normalized spectrum outputs for the high-band channel components and low-band channel components at the particular frame j are calculated using the following formula.

$$SUB(j) = \left\{ \sum_{i=HS}^{CHNNO} NSP(i,j) \right\} / (CHNNO - HS + 1) - \left\{ \sum_{i=1}^{LE} NSP(i,j) \right\} / LE \quad (11)$$

Here, HS and LE are set through experiments, for example:

$$LE = CHNNO/3;$$

$$HS = 2 \cdot CHNNO/3.$$

It is then determined whether or not the following condition (C) is satisfied.

$$SUB(j) > THL\ 11 \qquad (C)$$

HERE THL 11 is a predetermined threshold value and is set at a value of approximately 0.

Next, if the condition (C) is satisfied, i. e., if it has been determined that the frame has consonantal properties, the first consonantal pattern value determining means 121 determines whether or not the normalized spectrum output satisfies condition (D) (S14):

$$NSP(i, j) > THL\ 12 \qquad (D).$$

Here THL 12 is a predetermined threshold and is set at a value of approximately 0.

In a channel which satisfies condition (D), the following value is assigned to the consonantal pattern (S15).

$$CMP(i, j) = NSP(I, j).$$

In a channel which does not satisfy the condition (D), the following value is assigned to the consonantal pattern (S16)

$$CMP(i, j) = 0.$$

The rest of the operation is similar to that described with reference to FIG. 3B.

Figure 9A:
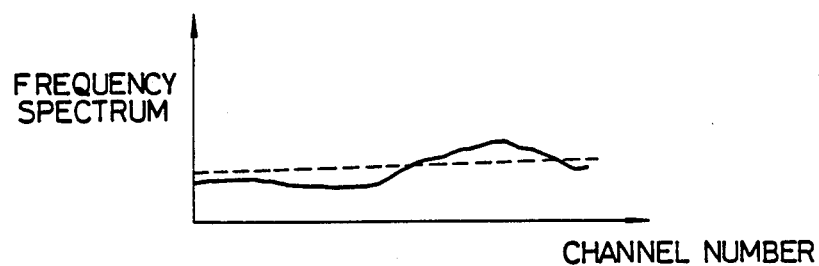
FIGS. 9A and 9B are diagrams showing the frequency spectrum and normalized spectrum for the consonantal portion at the begining of "shichi".
Figure 9B:
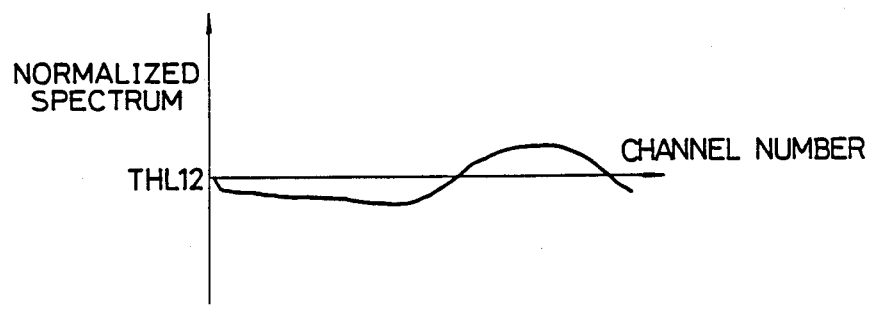

The description of the functions of the embodiment of FIGS. 2 to 6B described with reference to FIGS. 4, 5A, 5B, 5C, 6A and 6B also applies to the present embodiment. In addition, FIG. 9A and FIG. 9B are diagrams showing the frequency spectrum and normalized spectrum for the consonantal portion at the begining of "shichi".

In the case of utterance "shichi" the regions within which the local peak patterns are 1 appear as shown by the black parts in FIG. 5 and the regions within which the values of the consonantal patterns are equal to the values of the normalized spectrum at the particular frame number appear, respectively, as shown by the black parts C02 and C03. The spectrum outputs for the begining of the word "shichi" shown in FIG. 5A appear as shown in FIG. 9A. Its normalized spectrum output appear as shown in FIG. 9B. It thus satisfies condition (C) and is determined as a consonantal frame. It further satisfies the condition (D): NSP (i, j) >THL12, with THL12 being assumed to be set at 0. The regions within which the values of the consonantal patterns equal the values of the normalized spectra at the corresponding channels and frames are indicated by C02 in FIG. 5C.

As is clear from the preceding explanation, the method adopted in the speech-recognition system of this invention is one in which both the local-peak patterns, which are the results obtained by stably extracting the characteristics of the steady vowel portions, and the consonantal patterns, which are the results obtained by stably extracting the characteristics of the consonantal portions, are recognized and identified. This makes it possible to perform accurate and stable speech recognition including also the characteristics of the consonants.

What is claimed is:

1. A speech-recognition system in which time-series patterns of characteristic quantities are extracted periodically at each frame defined as a predetermined time interval from an input utterance within a voiced interval, i.e. within a time interval from the start point of the utterance until its end point, the similarities are calculated between these time-series patterns and reference patterns prepared in advance, and the similarity is calculated for each category to be recognized, and the category having the largest similarity among all the categories to be recognized is used as the result of the recognition, the speech-recognition system comprising:

(a) a spectrum normalizer which performs frequency analysis in a plurality of channels (numbered by their central frequencies) and logarithmic conversion and extracts the frequency spectra, and then calculates normalized spectrum patterns by normalizing the frequency spectra with least square fit lines;

(b) a consonantal pattern extractor which makes judgement as to whether each frame has consonantal properties and creates consonantal paterns by processing in sequence the frames within a voiced interval, extracting the consonantal patterns in those frames which are judged to have consonantal properties, and not extracting consonantal patterns in those frames which are judged to lack consonantal properties (i.e., in which the value is set at 0 in all channel components);

(c) a local-peak pattern extractor, which creates local peak patterns by processing all the frames within a voiced interval, assigning number 1 to those channel components in which the value of the normalized spectrum pattern is positive and reaches a maximum, and assigning number 0 to all the other channel components;

(d) a consonantal similarity degree calculator which calculates the similarity between the consonantal patterns calculated by the extractor in (b) and consonantal reference patterns prepared in advance, and calculates the consonantal similarity for each category to be recognized;

(e) a memory unit for the consonantal reference patterns;

(f) a local-peak similarity calculator which calculates the similarity between the local-peak patterns calculated by the extractor in (c) and local-peak reference patterns prepared in advance, and calculates the local-peak similarity for each category to be recognized; and (g) an identifier which references both the consonantal similarity and the local-peak similarity and calculates the comprehensive similarity for each category to be recognized, and selecting, among all the categories to be recognized, the category which has the largest comprehensive similarity as the result of recognition.

2. A system according to claim 1, in which the consonantal pattern extractor comprises means for making the judgement as to whether each frame has consonantal properties on the basis of the relative sizes of the value of the gradient of the least square fit line of a frequency spectrum and a predetermined threshold value.

3. A system according to claim 2, in which the consonantal pattern extractor comprises, for the purpose of processing all of the frames within a voiced interval and creating the consonantal patterns:
  (b1) means for identifying frames which calculates the gradients of the least square fit lines of the frequency spectra in the frames and determines that those frames which have gradient values larger than a predetermined threshold value have consonantal properties;
  (b2) first consonantal pattern determining means which, where a frame has been determined to have consonantal properties, assigns a consonantal pattern value of 1 to the channel components which have normalized spectrum values larger than a predeterminod threshold value, and a consonantal pattern value of 0 to the other channel components; and
  (b3) second consonantal pattern determining means which, where a frame has not been determined to have consonantal properties, assigns a consonantal pattern value of 0 to all the channel components in the frame.

4. A system according to claim 1, in which the consonantal pattern extractor comprises means for making the judgement as to whether each frame has consonantal properties on the basis of the relative sizes of the difference between the normalized spectrum value at the high-band channel regions and low-band channel regions, and a predetermined threshold value.

5. A system according to claim 4, in which the consonantal pattern extractor comprises, for the purpose of processing all the frames within a voiced interval and creating the consonantal pattern:
  (b1) means for identifying frames which determines that those frames in which the difference between the normalized spectrum values at the high-band channel regions and the low-band channel regions are greater than the predetermined threshold value;
  (b2) first consonantal pattern determining means which, where a frame has been determined to have consonantal properties, assigns to the channel components which have normalized spectrum values larger than a predetermined threshold value, the value of the normalized spectrum at this channel, and a consonantal pattern value of 0 to the other channel components; and
  (b3) second consonantal pattern determining means which, where a frame has not been determined to have consonantal properties, assigns a consonantal pattern value of 0 to all the channel components in the frame.

* * * * *